US006832952B2

(12) United States Patent
Faltesek et al.

(10) Patent No.: US 6,832,952 B2
(45) Date of Patent: Dec. 21, 2004

(54) METHODS AND APPARATUS FOR STORING AND DELIVERING AIR TO BUILDINGS

(75) Inventors: Anthony E. Faltesek, Roseville, MN (US); Ronald H. Jiracek, Maple Grove, MN (US); Todd P. Carpenter, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/142,112

(22) Filed: May 8, 2002

(65) Prior Publication Data

US 2003/0211825 A1 Nov. 13, 2003

(51) Int. Cl.[7] .............................................. F24F 7/007
(52) U.S. Cl. ................... 454/338; 454/342; 128/204.16
(58) Field of Search ............................... 454/338, 370; 128/202.13, 200.24

(56) References Cited

U.S. PATENT DOCUMENTS

| | | | | |
|---|---|---|---|---|
| 3,151,250 A | * | 9/1964 | Carlson ........................ 290/52 |
| 3,646,934 A | * | 3/1972 | Foster .................... 128/204.16 |
| 3,661,424 A | * | 5/1972 | Jacoby ........................... 299/4 |
| 3,758,029 A | * | 9/1973 | Yoshida ..................... 236/49.2 |
| 3,831,373 A | * | 8/1974 | Flynt ............................ 60/802 |
| 4,106,565 A | * | 8/1978 | Braddick .................... 166/118 |
| 4,121,429 A | * | 10/1978 | Grennard ....................... 62/45 |
| 4,311,409 A | * | 1/1982 | Stang ........................... 405/52 |
| 4,331,139 A | * | 5/1982 | Popa ..................... 128/202.13 |
| 4,373,573 A | * | 2/1983 | Madwed ..................... 165/236 |
| 4,380,187 A | * | 4/1983 | Wicks ........................ 454/342 |
| 4,467,796 A | * | 8/1984 | Beagley ........................ 10/142 |
| 4,648,523 A | * | 3/1987 | Strock ........................ 220/530 |
| 4,784,522 A | * | 11/1988 | Mraz .......................... 405/132 |
| 4,852,470 A | * | 8/1989 | Corriveau ................... 454/338 |
| 4,862,931 A | * | 9/1989 | Vella ............................. 141/1 |
| 5,052,856 A | * | 10/1991 | Tek ............................. 405/59 |
| 5,570,685 A | * | 11/1996 | Turiello ................. 128/202.13 |
| 5,800,260 A | * | 9/1998 | Kao ........................... 454/370 |
| 5,823,200 A | * | 10/1998 | Persaud ...................... 131/331 |
| 6,293,861 B1 | * | 9/2001 | Berry ......................... 454/255 |

OTHER PUBLICATIONS

Miller S., "Mining Megawatts from Compressed Air," New Analysis, IEEE Spectrum, pp. 27–28, Aug. 2001.

* cited by examiner

Primary Examiner—Derek S. Boles
(74) Attorney, Agent, or Firm—Kris T. Fredrick

(57) ABSTRACT

Methods and systems are provided for enhancing the air quality in buildings during a chemical and/or biological attack and/or when the air quality around a building drops to unacceptable levels. Preferably, relatively non-contaminated (clean) air is stored in one or more clean air reservoirs. Once stored, the clean air is selectively delivered to buildings when a chemical and/or biological attack is detected, and/or when the air quality around a building drops to unacceptable levels.

37 Claims, 9 Drawing Sheets

US 6,832,952 B2

METHODS AND APPARATUS FOR STORING AND DELIVERING AIR TO BUILDINGS

CROSS-REFERENCE TO CO-PENDING APPLICATIONS

This invention is related to co-pending U.S. patent application Ser. No. 10/142,543, filed May 8, 2002, entitled "Method And Apparatus For Transporting Air to Buildings", which is incorporated herein by reference.

FIELD OF THE INVENTION

This invention generally relates to methods and apparatus for enhancing the air quality in buildings, and more specifically, to methods and apparatus for enhancing the air quality in buildings during a chemical and/or biological attack and/or when the air quality around a building drops to unacceptable levels.

BACKGROUND OF THE INVENTION

The recent demise of the cold war and decline in superpower tensions has been accompanied by an increase in concern over the viability of weapons of mass destruction such as chemical and biological (CB) weapons. CB weapons include chemical agents such as phosgene, nerve agents such as Sarin, and biological agents such as anthrax, botulism, plaque, tularemia, and small pox. CB weapons may be delivered to occupants of a building in any number of ways, including the release of agents in or around the building. In some cases, the building's heating, ventilating, and air conditioning (HVAC) system may be used to help deliver the released agent into the building. Agents may also be released within public spaces of a building, and dispersed to other, private areas of the building via the buildings HVAC system.

In addition, and especially in urban settings, smog or other environmental contaminates can be present in and around buildings. Smog may be generated from cars, industrial plants, and other sources. To this end, the United States Environmental Protection Agency (EPA) often issues smog alerts when high concentrations of ground-level ozone (the main component of smog) are predicted in a given geographical area. Chemical spills or leaks may also be a source of released contaminates. Despite filtration, a building's HVAC system can deliver some of the smog and/or other contaminates into the building.

What would be desirable, therefore, are methods and apparatus for enhancing the air quality in buildings, and more specifically, methods and apparatus for enhancing the air quality in buildings during a chemical and/or biological attack and/or when the air quality around a building drops to unacceptable levels.

SUMMARY OF THE INVENTION

The present invention provides methods and apparatus for enhancing the air quality in buildings during a chemical and/or biological attack and/or when the air quality around a building drops to unacceptable levels. In a preferred embodiment, relatively non-contaminated (i.e. clean) air is stored in one or more clean air reservoirs. Once stored, the clean air is selectively delivered to buildings when a chemical and/or biological attack is detected, and/or when the air quality around a building drops to unacceptable levels.

In one illustrative embodiment, a reservoir is provided for storing air. A conduit is provided for transferring the stored air to the interior space of one or more buildings. A valve may be provided for selectively allowing the air stored in the reservoir to be transferred through the conduit to the one or more buildings. In some embodiments, a compressor may be used to pressurize the air that is stored in the reservoir, and/or a tensioning system may be used to help reduce the volume of the air reservoir as air is released from the reservoir. The valve may be controlled so that the pressure of the released air is substantially constant over time.

In some embodiments, the compressor is shut down when the air at the inlet of the compressor is subject to a chemical and/or biological agent or when the air quality drops below unacceptable levels. This may help prevent the air in the reservoir from becoming contaminated. Filters may also be provided.

In some embodiments, the air reservoir is an underground reservoir. The underground reservoir may be man-made or naturally occurring. For example, the underground reservoir may be a cavern in the ground, a salt dome, an ice cavern, a tunnel, a storm sewer, or any other underground cavity or opening. Alternatively, the reservoir may be an above ground reservoir. For example, the reservoir may be a converted grain elevator, water tower, petroleum storage tank, inflatable building, or any other suitable structure.

In some embodiments, the reservoir may include a sealing layer. The sealing layer may include, for example, a cement layer, an elastomeric layer, or any other suitable layer capable of providing an air seal and/or support to the air reservoir. Alternatively, or in addition, an air bladder may be inserted into the reservoir. The inner walls of the reservoir may provide support to the air bladder when the air inside the air bladder is pressurized.

Methods for converting an existing structure into a clean air reservoir are also contemplated. For example, in one illustrative method, an existing structure is sealed to provide a reservoir for storing air. A conduit is provided for transferring the stored air to one or more buildings. Finally, a valve is provided for selectively allowing the stored air to be transferred from the air reservoir, through the conduit, and into the one or more buildings.

Methods for accepting the clean air supply into a building are also contemplated. For example, in one illustrative method, both the air intake and air exhaust of the building are closed. The clean air supply is then accepted, and a positive air pressure is maintained in the building. When the building has two or more floors, air may also be pumped from a lower floor to one or more upper floors and/or from an upper floor to one or more lower floors to help reduce pressure differentials between floors. Maintaining a positive pressure in buildings may help keep external contaminates from entering the building.

In another illustrative method, the clean air is directed into the ventilation system of a building to help improve the air quality in the building. The air intake of the building may be left open, partially closed, or closed altogether. The clean air supply may be used to replace or supplement the air that is normally drawn from the air intake of the building. The remainder of the building's HVAC system may operate in a conventional manner, if desired. This method may be particularly useful when, for example, smog or the like is detected in or around a building.

DETAILED DESCRIPTION OF THE INVENTION

Figure 1:
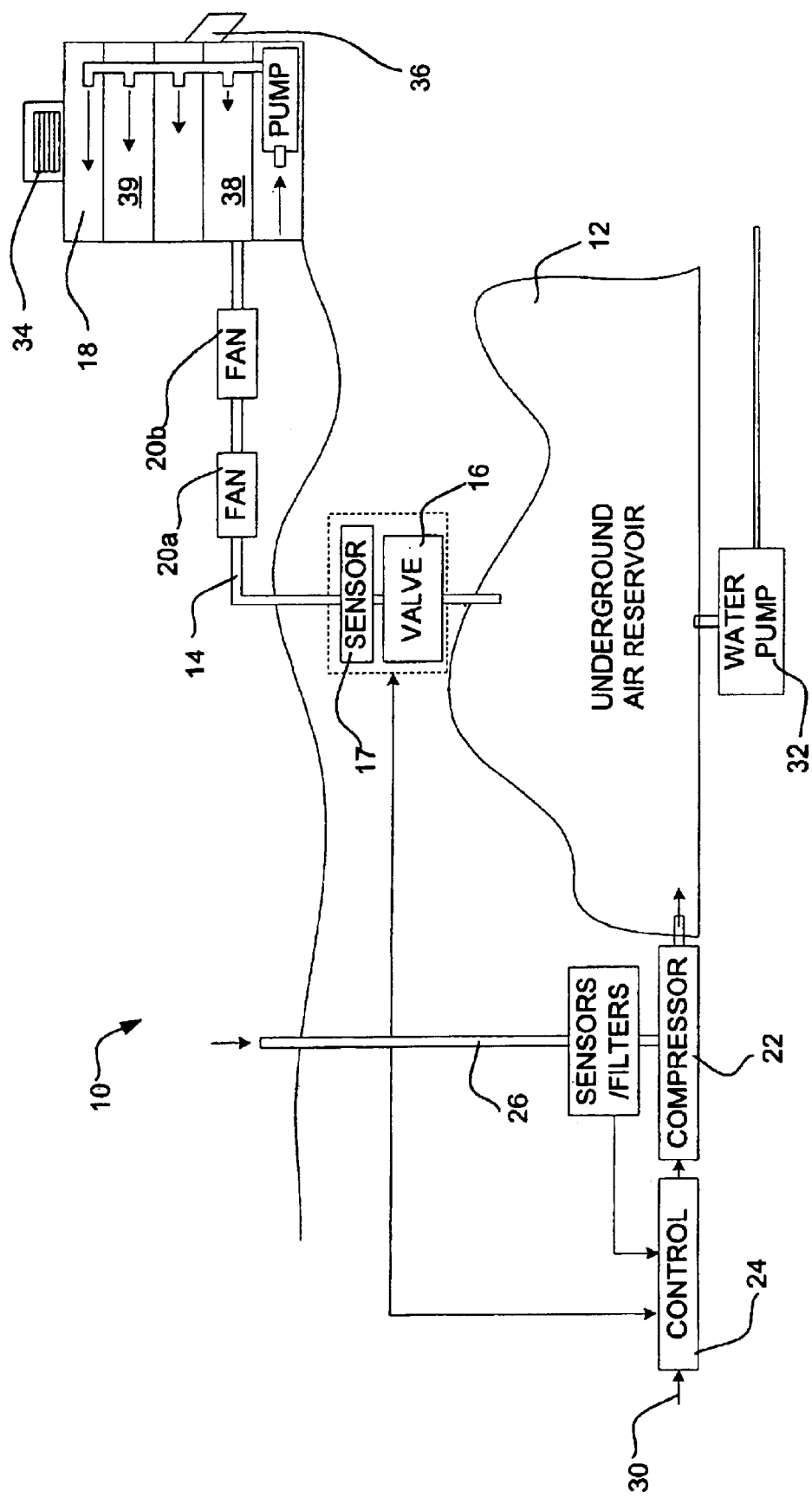
FIG. 1 is a highly diagrammatic schematic view of an illustrative system that uses an underground reservoir to store air to enhance the air quality in buildings during a chemical and/or biological attack and/or when the air quality around a building drops to unacceptable levels.

FIG. 1 is a highly diagrammatic schematic view of an illustrative system that uses an underground reservoir to store air to enhance the air quality in buildings during a chemical and/or biological attack and/or when the air quality around a building drops to unacceptable levels. The illustrative system is generally shown at 10, and includes an underground reservoir 12, a conduit 14, and a valve 16.

The underground reservoir 12 may be a man-made or naturally occurring reservoir. For example, the reservoir may be an underground cavern, salt dome, ice cavern, tunnel, storm sewer, or any other underground cavity or opening that can store or be adapted to store air. By having the reservoir 12 underground, the reservoir 12 may be at least somewhat protected from attack.

The underground reservoir 12 preferably stores air. The air can then be used to enhance the air quality in buildings during a chemical and/or biological attack and/or when the air quality around a building drops to unacceptable levels. Conduit 14 is provided to transfer the air stored in the underground reservoir 12 to the interior space of one or more buildings 18. Valve 16 is provided to selectively release the air that is stored in the reservoir 12 to the conduit 14. The valve 16 may be adjacent to the underground reservoir 12 as shown, adjacent to the building 18, or somewhere in between, as desired. One or more boost fans 20a–20b may also be provided along conduit 14 to increase the air velocity in the conduit 14, if desired. The number of boost fans 20a–20b may depend on a number of factors, including the length and cross-section of the conduit 14. The boost fans referred to herein may be any suitable air mover, including for example, high velocity fans, air compressors, etc.

In the illustrative embodiment, the air from the conduit is provided to the building 18. In one illustrative embodiment, both the air intake 34 and air exhaust 36 of the building 18 are closed. The clean air supply is then accepted, and a positive air pressure is maintained in the building. When the building has two or more floors, an air pump (e.g. fan, compressor, etc.) may be provided to pump air from a lower floor 38 to one or more upper floors 39 and/or from an upper floor 39 to one or more lower floors 38 to help reduce pressure differentials between floors. Maintaining a positive pressure in building 18 may help keep external contaminates from entering the building 18.

Alternatively, or in addition, the clean air from the conduit 14 may be directed into the ventilation system of building 18 to help improve the air quality in the building. The air intake 34 of the building 18 may be left open, partially closed, or closed altogether. The clean air supply from conduit 14 may be used to replace or supplement the air that is normally drawn from the air intake 34. The remainder of the building's HVAC system may operate in a conventional manner, if desired.

In some embodiments, a compressor 22 is used to pressurize the air that is stored in the reservoir 12. Pressurizing the air may increase the amount of air that is available by several times. A controller 24 may be used to control the compressor and/or valve 16. The controller 24 may, for example, control the valve so that the pressure of the air that is released from the reservoir 12 remains substantially constant over time. A pressure sensor 17 may be provided for measuring the air pressure of the released air through the valve 16. The output of the pressure sensor 17 may be provided to the controller 24, which can then adjust the valve 16.

The controller 24 may shut down the compressor when the air at the inlet 26 of the compressor 22 has a chemical and/or biological agent or when the air quality drops below unacceptable levels. One or more sensors 28 may be provided in fluid communication with the inlet 26 of the compressor 22 to detect chemical and/or biological agents and/or air quality. Alternatively, or in addition, the controller 24 may shut down the compressor 22 whenever the valve 16 is opened. The controller 24 may receive control signals via interface 30, which may, among other things, indicate a chemical and/or biological attack and/or poor air quality. Shutting down the compressor 22 may help prevent the air in the reservoir 12 from becoming contaminated.

It is also contemplated that the space containing the compressor 22 may have a filtered air supply to keep the space positively pressured and free from contamination. Shutting down the compressor 22 may include turning off the compressor 22 completely, disengaging the air pump of the compressor from the power source (e.g. engine), or redirecting the air provided by the compressor to somewhere other than the air reservoir 12.

A filter may be provided on the inlet 26 of the compressor 22 to filter the air that is provided to the reservoir 12. A water pump 32 may also be provided to purge water that collects in the underground reservoir 12. The water pump 32 may be assisted by the pressure in the reservoir 12, which may lift the water to the inlet of the water pump 32, or may be a bottom fed pump.

In some embodiments, the reservoir 12 may include a sealing layer. The sealing layer may be, for example, a cement layer, an elastomeric layer, or any other suitable layer or layers capable of providing an air seal and/or support to the reservoir 12. Some underground reservoirs 12 may not need a separate sealing layer (e.g. salt dome, ice cavern, etc.). However, even in some of these cases, a sealing layer and/or support layer may be desirable to help support to the interior walls of the reservoir 12. In some cases, both a cement layer and an elastomeric layer may be desirable.

Figure 2:
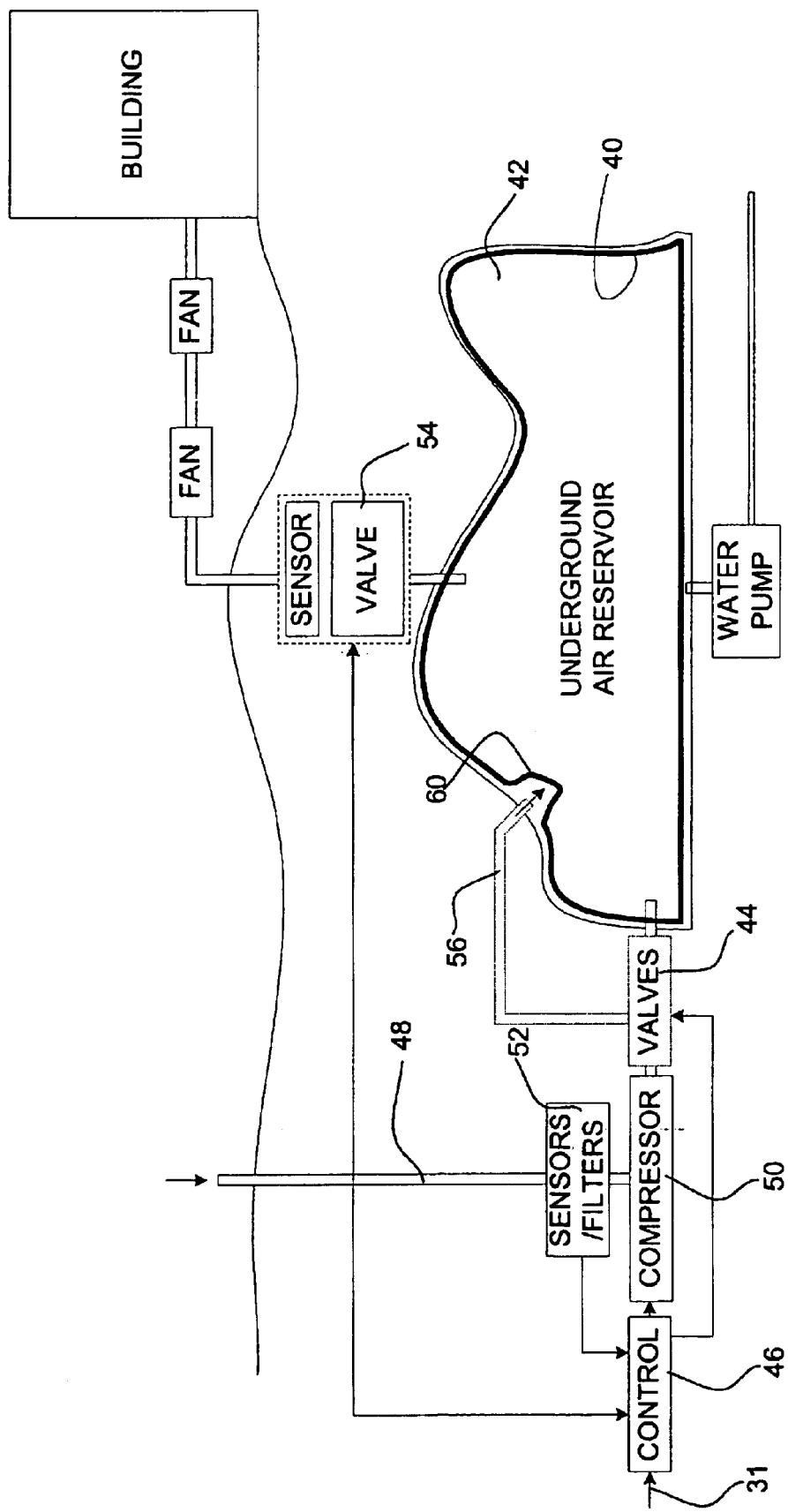
FIG. 2 is a highly diagrammatic schematic view of another illustrative system that uses an underground reservoir to store air to enhance the air quality in buildings during a chemical and/or biological attack and/or when the air quality around a building drops to unacceptable levels.

FIG. 2 is a highly diagrammatic schematic view of another illustrative system that uses an underground reservoir to store air to enhance the air quality in buildings during a chemical and/or biological attack and/or when the air quality around a building drops to unacceptable levels. In this embodiment, an air bladder 40 is provided in the underground reservoir 42. The inner walls of the reservoir 42 may provide support to the air bladder 40 when the air inside the air bladder 40 is pressurized. The air bladder 40 is preferably a tough, elastic material that can be made to fit the underground reservoir 12. The walls of the underground reservoir 12 may be coated to provide a relatively smooth surface to help prevent puncture of the air bladder 40, particular when the air bladder 40 is pressurized.

The illustrative embodiment shown in FIG. 2 operates similar to the embodiment shown in FIG. 1. That is, the controller 46 may shut down the compressor 50 when the air at the inlet 48 of the compressor 50 has a chemical and/or biological agent or when the air quality drops below unacceptable levels. One or more sensors 52 may be provided in fluid communication with the inlet 48 of the compressor 50 to detect chemical and/or biological agents and/or air quality. Alternatively, or in addition, the controller 46 may shut down the compressor 50 whenever the valve 54 is opened.

The controller 46 may also receive control signals via interface 31, which may, among other things, indicate a chemical and/or biological attack and/or poor air quality. Shutting down the compressor 22 may help prevent the air in the reservoir 12 from becoming contaminated. Shutting down the compressor 50 may include turning off the compressor 50 completely, disengaging the air pump of the compressor 50 from the power source (e.g. engine), or redirecting the air provided by the compressor 50 to somewhere other than the air reservoir 42.

FIG. 2 also shows in dashed lines one or more valves 44 and a conduit 56. The one or more valves 44 are interposed between the compressor 46 and the air reservoir 42, and are controlled by controller 46. Rather than shutting down the compressor 50 when a chemical and/or biological agent is detected or when the air quality drops below unacceptable levels, the controller 46 may instruct the valves 44 to direct at least part of the air provided by the compressor 50 to the backside of the air bladder 40 via conduit 56. The air delivered by conduit 56 may help provide pressure to the back-side of the air bladder 40, as shown at 60. As the air is released from the air bladder 42 through the valve 54, the inward pressure on the air bladder 40 may help maintain the pressure in the air bladder 40 by reducing the volume of the air bladder 40. This may increase the amount of air that is available for distribution to the one or more buildings.

Figure 3:
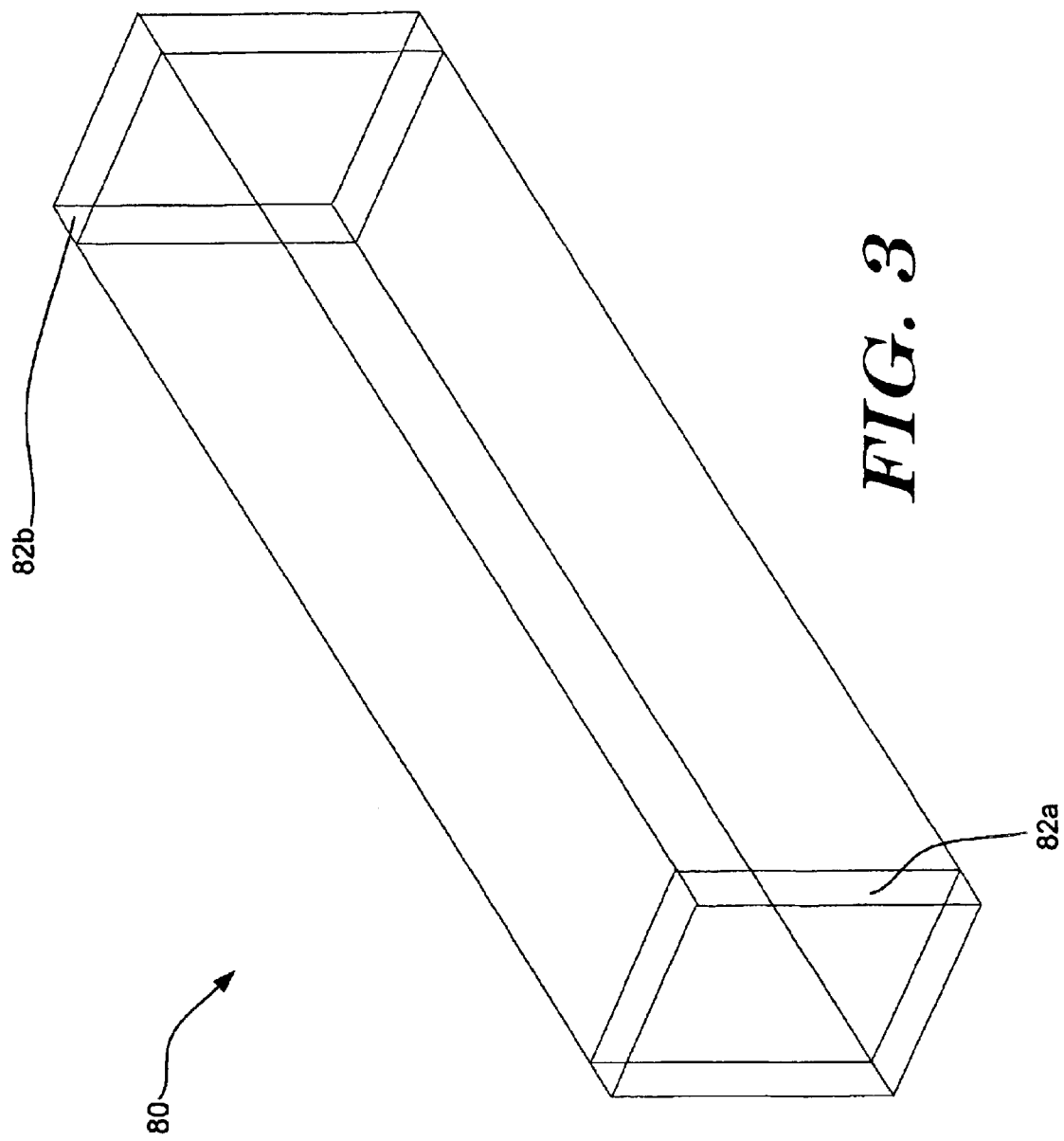
FIG. 3 shows a tunnel that has been adapted to store air in accordance with the present invention.

As indicated above, the underground reservoir may be any man-made or naturally occurring underground reservoir, including a cavern in the ground, a salt dome, an ice cavern, a tunnel, a storm sewer, or any other underground cavity or opening. FIG. 3 shows an illustrative tunnel that has been adapted to store air in accordance with the present invention. The tunnel may be, for example, an abandoned utility, subway or sewer tunnel, or any other suitable or available tunnel. An advantage of using a tunnel is that they are often located under urban areas, which may allow the air reservoir to be located in close proximity to the buildings it services.

In the embodiment shown in FIG. 3, the tunnel 80 has been fitted with bulk-heads 82a and 82b. The bulk-heads 82a and 82b are preferably air tight bulk-heads that are capable of sealing in air under pressure. A compressor may be used to pressurize the space between the bulk-heads 82a and 82b, and a valve may be used to release the air stored between the bulk heads 82a and 82b. The compressor and valve are not shown in FIG. 3, but may be similar to those shown and described with respect to FIGS. 1 and 2. In some embodiments, the walls of the tunnel 80 are coated with a sealing layer to help provide an air-tight reservoir.

Figure 4:
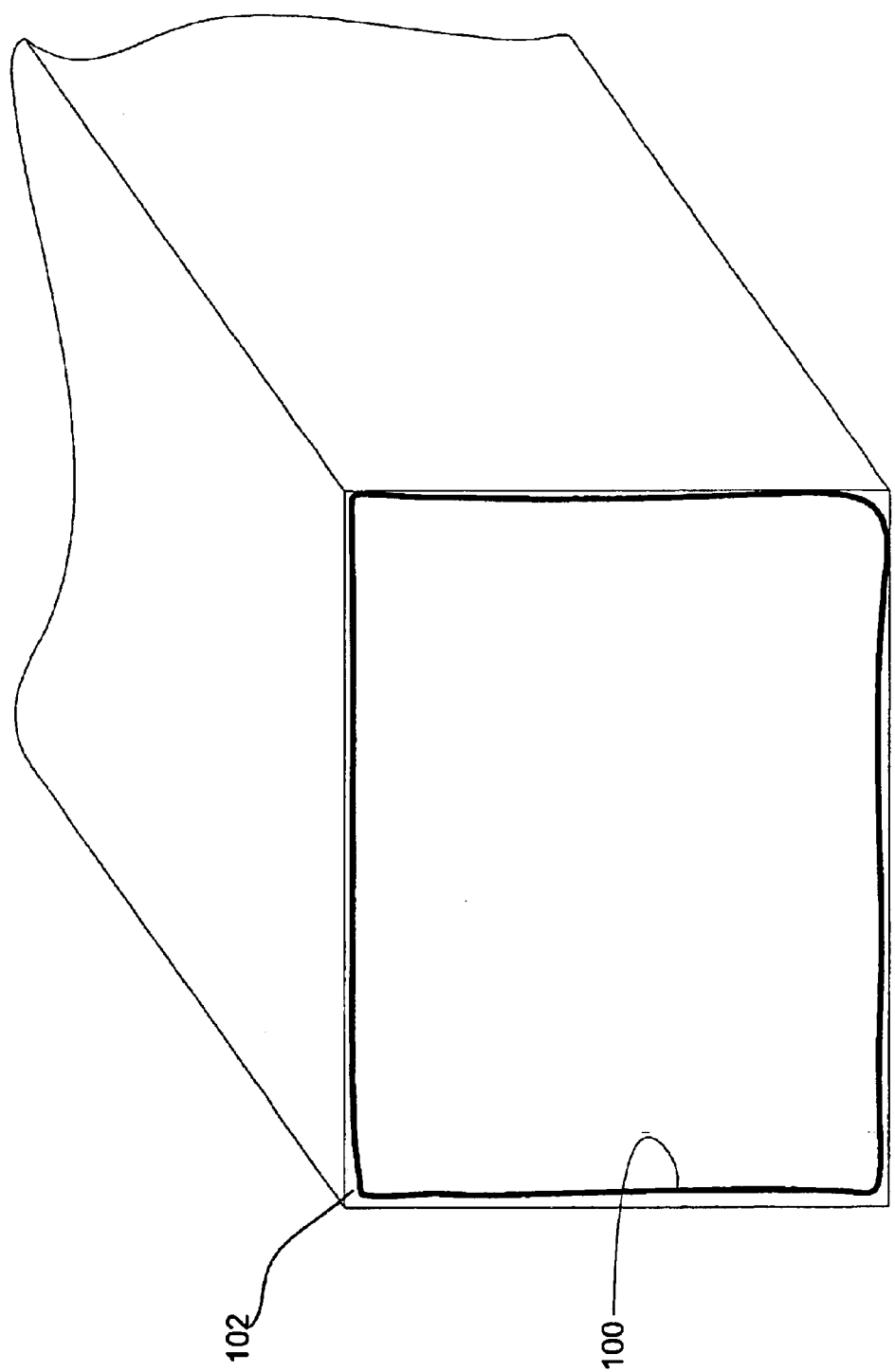
FIG. 4 shows another tunnel that has been adapted to store air in accordance with the present invention.

FIG. 4 shows another illustrative tunnel that has been adapted to store air in accordance with the present invention. In this embodiment, an air bladder 100 is provided in the tunnel 102. The inner walls of the tunnel 102 may provide support to the air bladder 100, particularly when the air bladder 100 is pressurized. The air bladder 100 is preferably a tough, elastic material that can be made to fit the tunnel 102. The walls of the tunnel 102 may be coated to provide a relatively smooth surface to help prevent puncture of the air bladder 100, particular when the air bladder 100 is pressurized.

Figure 5:
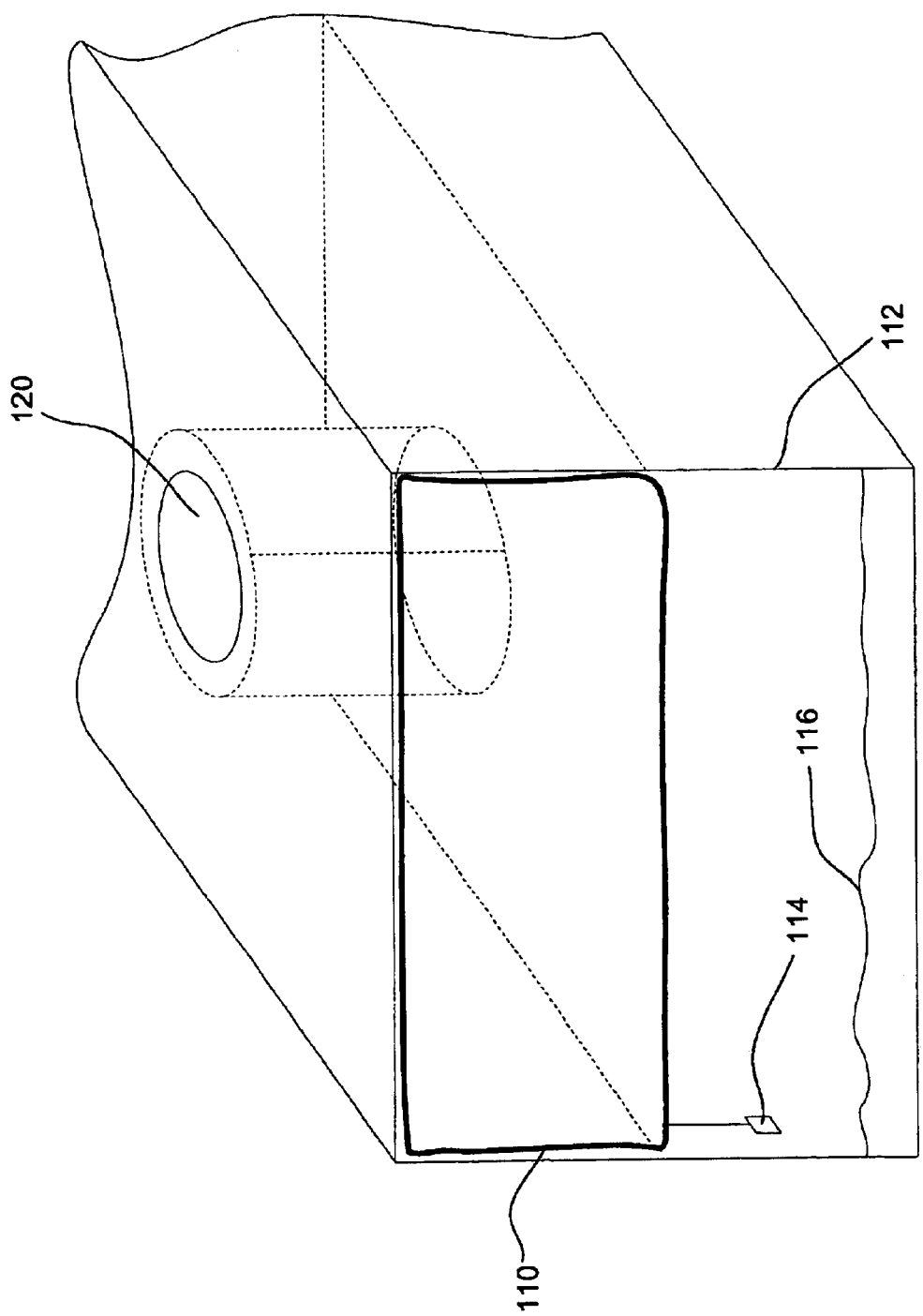
FIG. 5 shows a storm sewer that has been adapted to store air in accordance with the present invention.

FIG. 5 shows an illustrative storm sewer that has been adapted to store air in accordance with the present invention. In this embodiment, an air bladder 110 is provided in storm sewer 112. The bladder is preferably adapted to only consume an upper portion of the storm sewer 112, as shown. One or more water level sensors 114 may be provided to detect when the water level 116 in the storm sewer 112 reaches a predetermined level. For many storm sewers 112, the water level 116 will tend to rise during heavy rains. A controller (not shown) may receive signals from the water level sensors 114, and deflate the air bladder 110 when the water level 116 reaches the predetermined level. This may help to prevent blockage of the storm sewer by the air bladder 110 during heavy rains. Once the water level 116 drops back below the predetermined level, a compressor or the like may be used to re-inflate the air bladder 110.

It is contemplated that the air bladder 110 may be adapted to accommodate man-holes 120 or other access points. In the illustrative embodiment, the air bladder 110 is shaped to provide an opening or pathway under the man-hole 120, so that maintenance personnel can access the storm sewer 112. Alternatively, a cable or other pulling mechanism may be used to pull the air bladder 110 to the side to provide access to the storm sewer 112.

Figure 6:
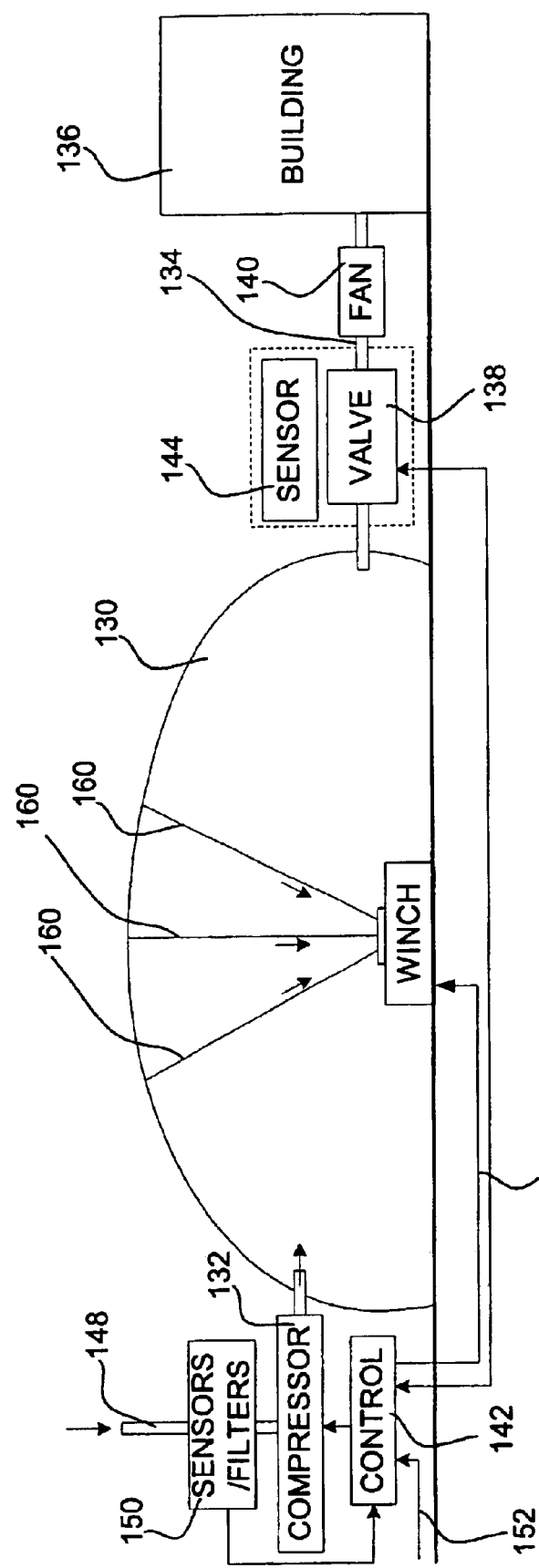
FIG. 6 is a highly diagrammatic schematic view of an illustrative system that uses an inflatable building to store air to enhance the air quality in buildings during a chemical and/or biological attack and/or when the air quality around a building drops to unacceptable levels.

FIG. 6 is a highly diagrammatic schematic view of an illustrative system that uses an inflatable building to store air to enhance the air quality in buildings during a chemical and/or biological attack and/or when the air quality around a building drops to unacceptable levels. The inflatable building may be, for example, an inflatable dome such as those housing tennis courts, athletic fields, etc, and even domed stadiums that are common in many cities. It is contemplated that dedicated inflatable building may be erected for the purpose of storing air, or existing inflatable buildings may be converted to store and deliver air when needed.

In the illustrative embodiment, an inflatable building is shown at 130. A compressor 132 provides air to the inside of the inflatable building 130. The compressor 132 may be a conventional air compressor or a just a fan, as desired. When using an existing inflatable building, the compressor 132 may be the compressor that is used to keep the inflatable building erect.

One or more conduits 134 are provided to transfer the air stored in the inflatable building 130 to the interior space of a building 136. A valve 138 is preferably provided to selectively release the air stored in the inflatable building 130 to the conduit 134. The valve 138 may be adjacent to the inflatable building 130 as shown, adjacent to the building 136, or somewhere in between, as desired. One or more boost fans 140 may be provided along conduit 134 to draw air from the inflatable building 130, and to increase the air velocity in the conduit 134, if desired. The number of boost fans 140 may depend on a number of factors, including the length and cross-section of the conduit 134.

A controller 142 may be used to control the compressor 132 and/or valve 138. The controller 142 may, for example, control the valve 138 so that the pressure of the air released from the inflatable building 130 remains substantially constant over time. A pressure sensor 144 may be provided for measuring the air pressure that is released through the valve 138.

The controller 142 may also shut down the compressor 132 when the air at the inlet 148 of the compressor 132 has a chemical and/or biological agent or when the air quality drops below unacceptable levels. One or more sensors 150 may be provided in fluid communication with the inlet 148 of the compressor 132 to detect chemical and/or biological agents and/or air quality. Alternatively, or in addition, the controller 142 may shut down the compressor 132 whenever the valve 138 is opened. In addition, the controller 142 may receive control signals via interface 152, which may, among other things, indicate a chemical and/or biological attack and/or poor air quality. Shutting down the compressor 132 may help prevent the air in the inflatable building 130 from becoming contaminated. Shutting down the compressor 132 may include turning off the compressor 132 completely, disengaging the air pump from the power source (e.g. engine), or redirecting the air provided by the compressor to somewhere other than the inflatable building 130.

It is also contemplated that the space containing the compressor 132 may have a filtered air supply to keep the space positively pressured and free from contamination. A filter 150 may be provided on the inlet 148 of the compressor 132 to filter the air that is provided to inflatable building 130.

When converting an existing inflatable building 130, it is contemplated that the controller 142 may interact with the existing controls of the inflatable building 130. When a chemical and/or biological attack and/or poor air quality is detected, the controller 142 may terminate normal operations of the inflatable building 130. The controller 142 may also close dampers over normally used air intakes, doors that would be a source of air leakage, and any other unnecessary source of air leakage.

For some inflatable buildings, the weight of the inflatable roof may be sufficient to maintain a positive air pressure in the inflatable building 130. However, when it is desirable to increase the positive air pressure, tensioning cables or straps 160 may be provided over the inflatable building. The tensioning cables or straps 160 may be connected to a winch 162 or the like, which may be controlled by controller 142 via interface 143. The controller 142 may instruct the winch 162 to pull at a slow rate, preferably through reduced gearing, to maintain a desired positive pressure in the inflatable building 130.

Alternatively, or in addition, tensioning cables or straps 160 may be attached to various points along the interior of the inflatable roof, and may be anchored to walls and/or floor of the building. In a domed stadium application, the tensioning cables or straps 160 may be anchored in the stands or at walls at the edge of the stands, for example. When configured in this manner, the tensioning cables or straps 160 may create and sustain a constant or substantially constant pressure in the inflatable building, preferably by pulling on the tensioning cables or straps 160 as directed by controller 142. By connecting the tensioning cables or straps 160 to various points along the interior of the inflatable roof, a positive pressure may be created in the inflatable building while minimizing any binding of the skin of the inflatable roof.

Figure 7:
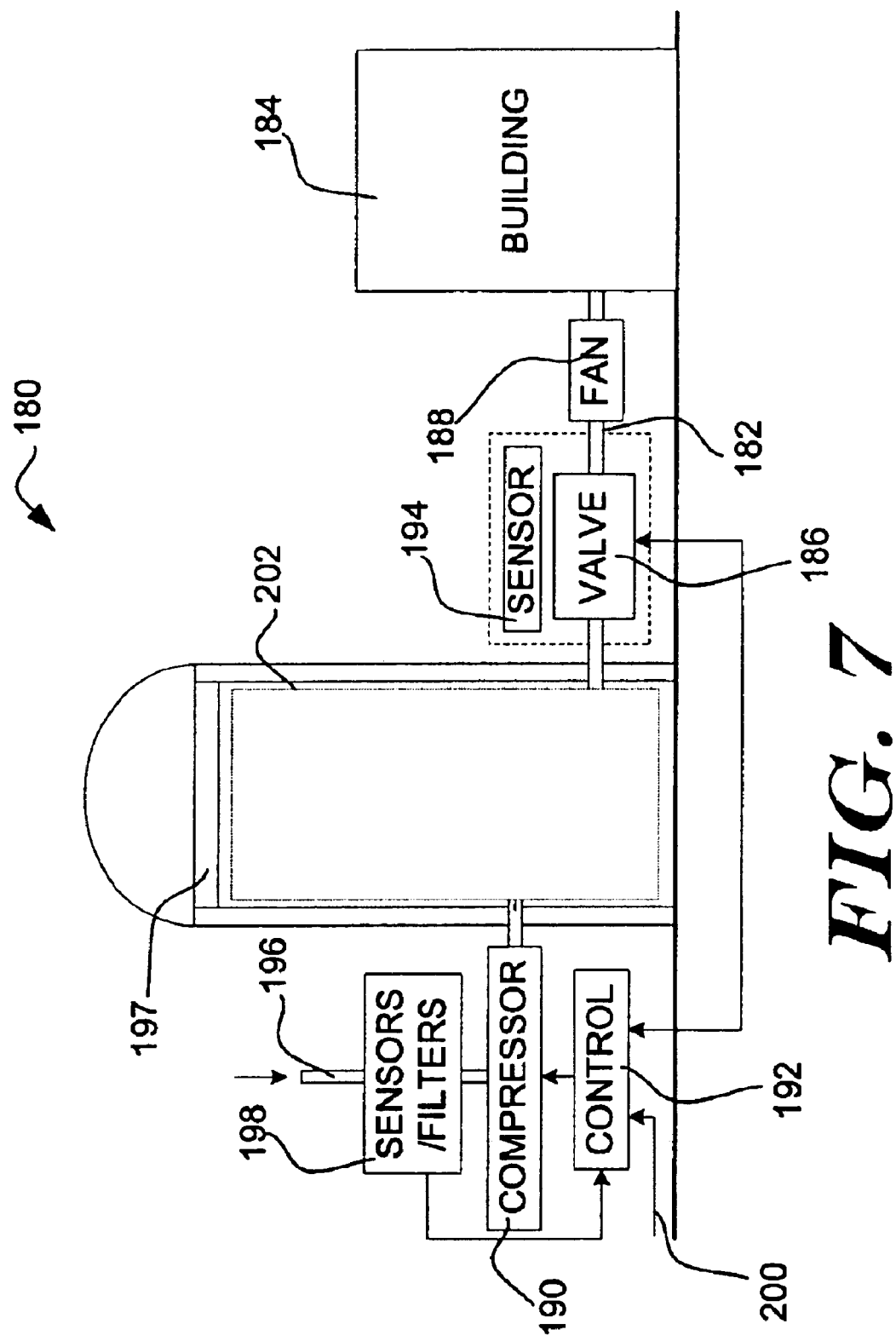
FIG. 7 is a highly diagrammatic schematic view of an illustrative system that uses a grain elevator to store air to enhance the air quality in buildings during a chemical and/or biological attack and/or when the air quality around a building drops to unacceptable levels.

FIG. 7 is a highly diagrammatic schematic view of an illustrative system that uses a grain elevator 180 to store air to enhance the air quality in buildings during a chemical and/or biological attack and/or when the air quality around a building drops to unacceptable levels. The grain elevator 180 preferably stores air, which is used to enhance the air quality in buildings during a chemical and/or biological attack and/or when the air quality around a building drops to unacceptable levels.

In the illustrative embodiment, one or more conduits 182 are provided to transfer the air stored in the grain elevator 180 to the interior space of a building 184. A valve 186 is also provided to selectively release the air stored in the grain elevator 180 to the conduit 182. The valve 186 may be adjacent to the grain elevator 180 as shown, adjacent to the building 184, or somewhere in between, as desired. One or more boost fans 188 may be provided along conduit 182 to increase the air velocity in the conduit 182, if desired. The number of boost fans 188 may depend on a number of factors including the length and cross-section of the conduit 182.

In some embodiments, a compressor 190 is used to pressurize the air that is stored in the grain elevator 180. Pressurizing the air may increase the amount of air that is available by several times. A controller 192 may be used to control the compressor 190 and/or valve 186. The controller 192 may, for example, control the valve 186 so that the pressure of the air that is released from the grain elevator 180 remains substantially constant over time. A pressure sensor 194 may be provided for measuring the air pressure that is released through the valve 186.

The controller 192 may shut down the compressor 190 when the air at the inlet 196 of the compressor 190 has a chemical and/or biological agent or when the air quality drops below unacceptable levels. One or more sensors 198 may be provided in fluid communication with the inlet 196 of the compressor 190 to detect chemical and/or biological agents and/or air quality. Alternatively, or in addition, the controller 192 may shut down the compressor 190 whenever the valve 186 is opened. In addition, the controller 192 may receive control signals via interface 200, which may, among other things, indicate a chemical and/or biological attack and/or poor air quality. Shutting down the compressor 190 may help prevent the air in the grain elevator 180 from becoming contaminated. Shutting down the compressor 190 may include turning off the compressor 190 completely, disengaging the air pump from the power source (e.g. engine), or redirecting the air provided by the compressor to somewhere other than the grain elevator 180.

It is contemplated that the space containing the compressor 190 may have a filtered air supply to keep the space positively pressured and free from contamination. A filter 198 may be provided on the inlet 196 of the compressor 190 to filter the air that is provided to the grain elevator 180.

In some embodiments, the grain elevator 180 may include a sealing layer. The sealing layer may be, for example, a cement layer, an elastomeric layer, or any other suitable layer or layers capable of providing an air seal and/or support to the grain elevator 180. In some cases, both a cement layer and an elastomeric layer may be desirable. An air-tight bulk-head 197 may also be installed near the top and/or bottom of the grain elevator 180 to help seal air into the grain elevator.

Alternatively, or in addition, an air bladder 202 may be provided in the grain elevator 180. The inner walls of the grain elevator 180 may help provide support to the air bladder 202, particularly when the air bladder 202 is pressurized. The air bladder 202 is preferably a tough, elastic material that can be made to fit the grain elevator 180. The walls of the grain elevator 180 may be coated to provide a relatively smooth surface to help prevent puncture of the air bladder 202, particular when the air bladder 202 is pressurized.

The air bladder 202 may be a flexible membrane, which may deflate when the pressure inside the air bladder 202 is bled off. Eventually, the one or more boost fans 188 may help create a negative pressure in the air bladder 202. This may allow the air bladder 202 to supply substantially all of the air stored in the air bladder. If the air bladder is a rigid, non-deflatable, air bladder, some of the air would likely have to remain in the grain elevator 180. While a grain elevator 180 is shown in FIG. 7, it is contemplated that any suitable structure may be converted to an air reservoir including, for example, a water tower, a petroleum storage tank, or any other suitable structure.

Figure 8:
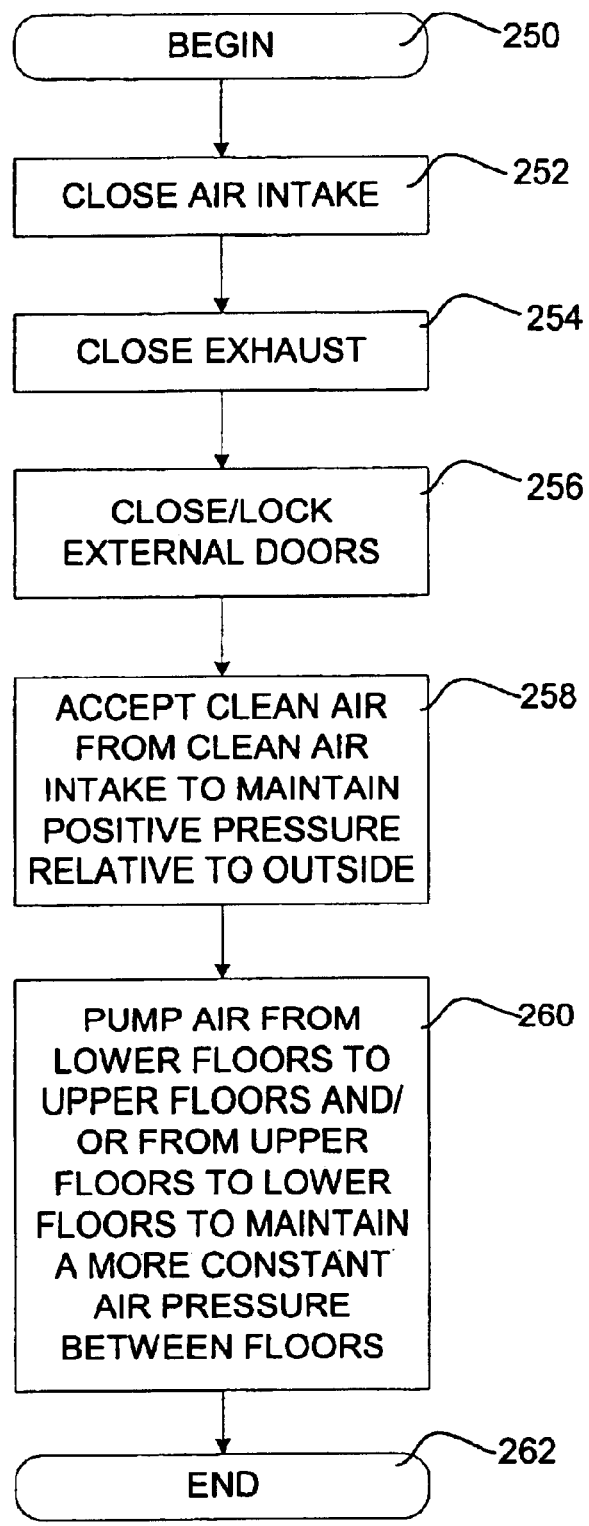
FIG. 8 is a flow diagram showing an illustrative method for accepting clean air into a building to enhance the air quality in the building during a chemical and/or biological attack and/or when the air quality around the building drops to unacceptable levels.

FIG. 8 is a flow diagram showing an illustrative method for accepting clean air into a building to enhance the air quality in the building during a chemical and/or biological attack and/or when the air quality around the building drops to unacceptable levels. The illustrative flow diagram is entered at 250. The air intake and air exhaust are closed at 252 and 254, respectively. When appropriate, the external doors are also closed and possibly locked as shown at 256. These steps help seal off the interior of the building from the external environment. As shown at 258, a clean air supply is accepted, and a positive air pressure is maintained in the building. Maintaining a positive pressure in the building may help keep external contaminates from entering the building.

When the building has two or more floors, air may also be pumped from a lower floor to one or more upper floors and/or from an upper floor to one or more lower floors to help reduce pressure differentials between floors, as shown at 260. This may make it easier to maintain a positive pressure throughout the building, and in particular, near the top of the building. The illustrative flow diagram is then exited at 262.

Figure 9:
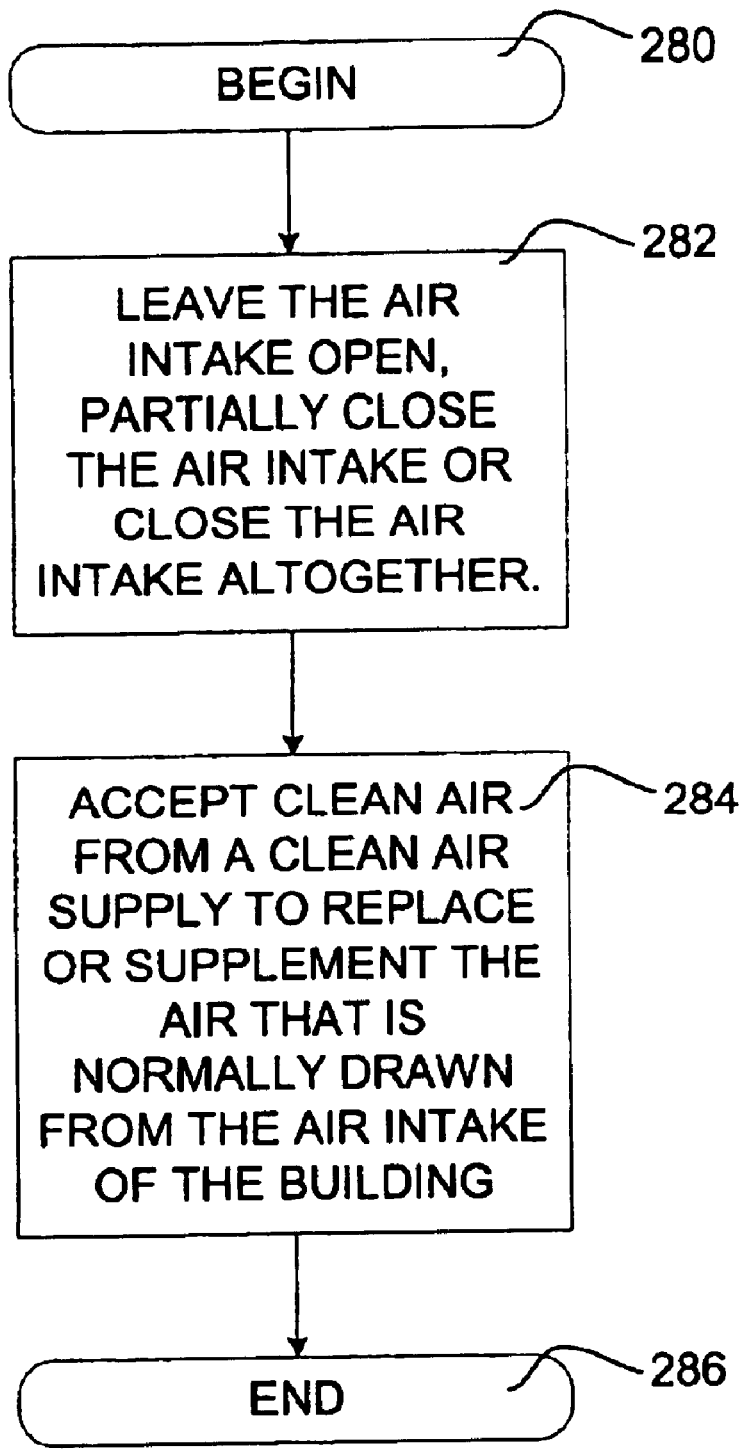
FIG. 9 is a flow diagram showing another illustrative method for accepting clean air into a building to enhance the air quality in the building during a chemical and/or biological attack and/or when the air quality around the building drops to unacceptable levels.

FIG. 9 is a flow diagram showing another illustrative method for accepting clean air into a building to enhance the air quality in the building during a chemical and/or biological attack and/or when the air quality around the building drops to unacceptable levels. In this illustrative method, the clean air supply is directed into the lo ventilation system of a building to help improve the air quality in the building. The flow diagram is entered at 280. The normal air intake of the building is left open, partially closed, or closed altogether, as shown at 282. The clean air supply is accepted, as shown at 284, and is used to replace or supplement the air that is normally drawn from the normal air intake of the building. The remainder of the building's HVAC system may operate in a conventional manner, if desired. The illustrative flow diagram is exited at 286.

Numerous advantages of the invention covered by this document have been set forth in the foregoing description.

It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A system for selectively providing clean air to the interior space of a building after the detection of an event, comprising:
   a reservoir for storing air;
   a conduit for transferring the stored air to the interior space of the building;
   an inlet for providing air to the reservoir;
   sealing means for sealing the inlet to the reservoir either before or after the detection of the event; and
   releasing means for selectively releasing at least some of the stored air in the sealed reservoir through the conduit.

2. A system according to claim 1 further comprising a compressor for pressurizing the stored air in the reservoir.

3. A system according to claim 2 further comprising a controller for actuating said releasing means.

4. A system according to claim 3 further comprising a pressure sensor for measuring the pressure of the air released to the conduit.

5. A system according to claim 4 wherein the controller controls said releasing means such that the pressure of the air released to the conduit is substantially constant over time.

6. A system according to claim 3 wherein the controller disengages the compressor when said releasing means is actuated.

7. A system according to claim 3 wherein the compressor includes an air inlet, the air inlet having an air inlet sensor for sensing one or more chemical and/or biological agents.

8. A system according to claim 7 wherein the controller disengages the compressor when the air inlet sensor detects one or more chemical and/or biological agents.

9. A system according to claim 7 wherein the air inlet of the compressor includes a filter.

10. A system according to claim 1 further comprising one or more boost fans positioned in the conduit to help transfer the air released from the reservoir to the building.

11. A system according to claim 1 wherein the reservoir is an underground reservoir.

12. A system according to claim 11 wherein the underground reservoir is a naturally formed underground reservoir.

13. A system according to claim 11 wherein the underground reservoir is a salt dome.

14. A system according to claim 11 wherein the underground reservoir is an ice cavern.

15. A system according to claim 11 wherein the underground reservoir has interior walls, and wherein the interior walls include a sealing layer.

16. A system according to claim 15 wherein the scaling layer includes a cement layer.

17. A system according to claim 14 wherein the sealing layer includes an elastomeric layer.

18. A system according to claim 11 wherein the underground reservoir houses an air bladder.

19. A system according to claim 11 wherein the underground reservoir is a man made tunnel.

20. A system according to claim 19 wherein the underground reservoir is a storm sewer with an air bladder therein.

21. A system according to claim 20, wherein the storm sewer includes one or more water level sensors that cause the air bladder to deflate when the water level in the storm sewer reaches a predetermined level.

22. A system according to claim 1 wherein the reservoir is a grain elevator.

23. A system according to claim 1 wherein the reservoir is a water tower.

24. A system according to claim 1 wherein the reservoir is a petroleum storage tank.

25. A system according to claim 1 wherein the reservoir is an inflatable building.

26. A system for selectively providing clean air to the interior space of a building, comprising:

an inflatable membrane for storing air;

a conduit for transferring the stored air in the inflatable membrane to the building;

a valve for selectively allowing the stored air in the inflatable membrane to be transferred through the conduit; and one or more tensioning means far applying tension to the inflatable membrane to selectively reduce the volume of the inflatable membrane.

27. A system according to claim 26 wherein the tension means includes one or more cables and a winch.

28. A system according to claim 26 wherein the tension means includes means for applying pressure to the outside of the inflatable membrane.

29. A system according to claim 26 wherein the inflatable membrane is an inflatable building.

30. A system according to claim 29 wherein the inflatable building is a domed stadium.

31. A method for converting a structure into a clean air reservoir that can be used to supply clean air to the interior space of a building, the method comprising the steps of:

sealing the converted structure to provide a reservoir for storing air;

providing a conduit for transferring the stored air to the interior space of the building; and providing a valve for selectively allowing the stored air in the reservoir to be transferred through the conduit to the interior space of the building.

32. A method for controlling the ventilation of a building having a ventilation system, the method comprising the steps of:

providing access to a remotely located clean air reservoir that stores clean air;

selectively accepting clean air from the remotely located clean air reservoir; and directing the clean air into the ventilation system of the building to increase the indoor air quality of the building.

33. A method according to claim 32 wherein the clean air is accepted when the air quality immediately around the building drops to an unacceptable level.

34. A method according to claim 33 wherein the air quality immediately around the building drops to an unacceptable level as a result of smog.

35. A method according to claim 33 wherein the air quality immediately around the building drops to an unacceptable level as a result of a chemical and/or biological attack.

36. A system for selectively providing clean air to the interior space of a building, comprising:

a reservoir for storing air;

a compressor for pressurizing the stored air in the reservoir;

a conduit for transferring the stored air to the interior space of the building;

a valve for selectively allowing the stored air in the reservoir to be transferred through the conduit; and means for preventing the compressor from providing additional air to the reservoir when the valve is selectively allowing the stored air in the reservoir to be transferred through the conduit.

37. A system for selectively providing clean air to the interior space of a building, comprising:

an inflatable membrane for storing air;

a conduit for transferring the stored air in the inflatable membrane to the building;

a valve for selectively allowing the stored air in the inflatable membrane to be transferred through the conduit; and tensioning means for applying tension to the inflatable membrane to selectively reduce the volume of the inflatable membrane.

* * * * *